Figure 1:
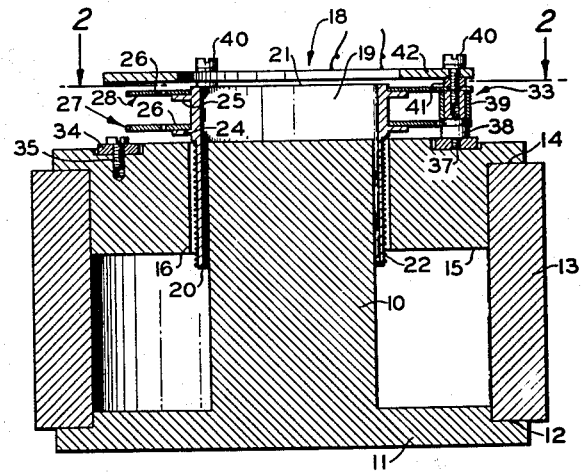

April 13, 1954   R. R. BROWN   2,675,533
SEISMOMETER
Filed March 26, 1951

INVENTOR.
R. R. BROWN
BY
Hudson & Young
ATTORNEYS

Patented Apr. 13, 1954

2,675,533

UNITED STATES PATENT OFFICE 2,675,533

SEISMOMETER

Raymond R. Brown, Bartlesville, Okla., assignor to Phillips Petroleum Company, a corporation of Delaware Application March 26, 1951, Serial No. 217,433

5 Claims. (Cl. 340—17)

This invention relates to seismometers and, more particularly, to seismometers wherein a coil is moved in a magnetic field responsive to seismic waves. In one specific aspect, the invention relates to a novel spring suspension unit adapted for use with such seismometers.

Seismometers of the so-called "moving coil" type ordinarily include means, usually a permanent magnet, for producing a magnetic field, structure cooperating with this field-producing means to form a closed magnetic circuit having an air gap, and an inertia body carrying a coil which is suspended within the air gap in the magnetic field. When seismic waves are incident upon the apparatus, the magnetic structure is moved relative to the inertia body and coil with the result that a current is induced in the coil which is representative of the seismic waves. Further, in such seismometers, there is a spring suspension of some type connecting the inertia body and the magnetic structure to permit the aforementioned relative movement. Heretofore, at least part of this spring suspension has been located within the structure for producing the closed magnetic circuit. As a result, in order to remove the inertia body assembly or coil for replacement or repair, it has been necessary to disassemble the structure forming the magnetic circuit. Such disassembly, in itself, is inconvenient and time consuming. Furthermore, in practical seismometers, the magnetic attraction between the parts is so strong and the engaging surfaces between different parts of the magnetic structure are so accurately machined that the bond between these parts is so strong as to prevent disassembly of the structure without demagnetizing it. Such a demagnetizing operation constitutes another time consuming and troublesome step in the repair or replacement of the inertia body or coil.

In accordance with this invention, the entire spring suspension is located outside the structure defining the closed magnetic circuit with the result that it is not necessary to disassemble the magnetic structure in order to disconnect the springs of the suspension unit and thereby remove the inertia body and coil. This results in a substantial saving in time and effort. I am aware that many types of spring suspensions exist wherein the springs are located outside the bodies to be suspended. However, in seismic work, where an extremely strong magnetic field must exist, a spring suspension of unique character must be provided to properly maintain the inertia body and magnetic structure in their proper relationship. It is therefore, an important object of my invention to provide a spring suspension unit which is readily accessible without disassembly of the magnetic structure of the seismometer, and which still overcomes the peculiar problems in obtaining proper suspension arising from the necessary high strength of the magnetic field and the minute scope of the movements produced by the seismic waves incident upon the seismometer.

It is a further object of the invention to provide a suspension unit of novel type which is useful in applications other than seismometers.

It is a still further object to provide a seismometer which is of rugged construction, reliable in operation, and economical to manufacture.

Figure 2:
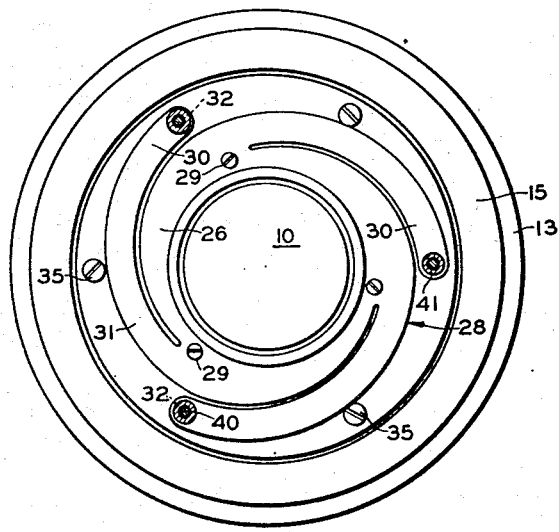

Various other objects, advantages and features of the invention will become apparent from the the following description, taken in conjunction with the accompanying drawing, in which:

Figure 1 is a vertical sectional view of a seismometer constructed in accordance with the invention; and Figure 2 is a top view of the seismometer showing the construction and arrangement of the top spring.

Referring now to the drawings in detail, the seismometer includes structure for forming a closed magnetic circuit, and for producing a strong magnetic field in this circuit. While the particular construction of the magnetic circuit may vary, I have shown a central cylindrical core 10 having an integral base plate 11 extending radially outward therefrom. The outer edge 12 of plate 11 is flanged to receive an annular permanent magnet 13 which also fits into and engages a flanged portion 14 of a plate 15 which extends radially inward to a position closely spaced from the core 10. In this manner, the surfaces of the core 10 and plate 15 define an annular air gap 16. The core 10 and plates 11, 15 are, of course, formed from magnetic material so as to provide a closed magnetic circuit, and the various parts of the structure defining this magnetic circuit are held in assembled relation by magnetic attraction.

The seismometer also includes an inertia body 18 which, in the embodiment shown, includes a cylindrical metal member 19 of non-magnetic material, such as anodized aluminum, which has coil-supporting portion 20 disposed within the air gap 16 and an outwardly protruding part 21 which is positioned outside the magnetic structure. The portion 20 carries a coil 22 which is, therefore, disposed within the air gap 16 and in the magnetic field.

The protruding part 21 has two longitudinally-spaced flanges 24 and 25 which are secured, respectively, to the central portions 26 of a pair of flat leaf springs 27 and 28 by suitable fixtures, such as bolts 29.

The springs 27, 28 are of identical construction and each includes the aforementioned central circular portion 26 together with a plurality of curved arms 30, the inner ends 31 of which are integral with the central portion 26 and the outer ends 32 of which are provided with holes or openings.

The ends 32 of all of the arms 30 are secured to a support 33 in the manner now to be described. A ring 34 of non-magnetic material, such as brass, is suitably secured within a recess in plate 15 by suitable fixtures, such as bolts 35. This ring is of larger diameter than the flanges 24, 25 and is coaxial with the inertia body and flanges. The openings in the upper and lower springs 27 and 28 are in longitudinal or vertical alignment and are positioned adjacent the ring 34 at each of several positions around the circumference thereof. At each such position, a threaded stud on a fixture 37 is fitted into the ring, this fixture having an enlarged spacer portion 38 which is positioned between ring 34 and the corresponding opening in the arm of the lower spring 27. There is, accordingly, a set of fixtures 37, one for each of the arms 30. Each screw 40 carries a spacer 41, a ring 42 of insulating material being mounted between the head screw 40 and spacer 41. This ring carries suitable terminals for receiving the coil leads, not shown, which extend through an opening in member 19 to the terminals.

Also fitting upon each fixture 37 is a spacer 39 which extends upwardly to the corresponding opening in the end 32 of upper spring 28, the upper spring arm being fixedly secured to the spacer 39 by a screw 40. Thus, there is a set of spacers 39 which rigidly support the arms 30 of the upper spring 28 and accurately maintain a predetermined separation between the two springs.

When seismic waves are incident upon the seismometer, there is a vertical upward or downward movement of the magnetic structure with respect to the inertia body 18 and the coil 22 which induces a current in the coil representative of the seismic waves. It will be noted that the described structure offers a number of important advantages. The use of the double spring suspension permits only vertical relative movement between the inertia body and magnetic structure while effectively preventing transverse movement, thus contributing materially to the accuracy with which the induced electrical currents correspond to the seismic waves producing them. The springs 27, 28 are completely outside the magnetic structure constituted by elements 10, 11, 13 and 15. As a result, the springs can be removed and the inertia body taken out without disassembling or in any way disturbing the magnetic structure. Finally, the springs themselves are readily accessible for such adjustments as may be required and do not involve removal of the inertia body. The use of the metal coil-receiving portion 20 provides an efficient damping action so that it is not necessary to short circuit the leads of the seismometer when it is moved from one location to another. Finally, the seismometer is of extremely compact construction and utilizes a minimum number of parts.

While this invention has been described in connection with present, preferred embodiments thereof, it is to be understood that this description is illustrative only and is not intended to limit the invention, the scope of which is defined by the appended claims.

I claim:

1. A seismometer comprising, in combination, an elongated core, an annular permanent magnet mounted coaxially with said core, a top plate and a bottom plate extending radially from the core to the magnet, all of said parts being formed from magnetic material so as to define a closed magnetic circuit, one of said plates being constructed to define, with said core, an annular gap, an inertia body including a cylindrical metal coil-supporting portion, a coil mounted on said portion and disposed within said air gap, said inertia body having a part thereof protruding outwardly from said air gap, a pair of longitudinally spaced flanges formed upon said protruding part of the inertia body, a pair of flat thin leaf springs each having a continuous generally circular central region overlying and in contact with one of said flanges, a plurality of fixtures securing each central region to its associated flange, each spring further including a plurality of curved arms integral at one end thereof with said central region, the outer ends of said arms being disposed in axial alignment with the corresponding outer arms of the other spring, a ring of non-magnetic material secured to the plate adjacent said protruding part of the inertia body, spacers interposed between corresponding outer ends of the spring arms, and means for fixedly securing each spacer to said ring.

2. A spring suspension unit including a ring of non-magnetic material adapted to be secured to a support forming a part of a magnetic circuit, a plurality of fixtures, each secured to said ring and having an upstanding end portion, a spacer disposed about the protruding end of each fixture, a body to be suspended having a flange of smaller diameter than said ring and disposed coaxially therewith, and a flat resilient plate means extending between said flange and each of said fixtures, said resilient means terminating at the region of each fixture in an arm having an opening therein through which extends the corresponding fixture, and means for forcing the end of said arm into engagement with the associated spacer.

3. A spring suspension unit including a ring of non-magnetic material adapted to be secured to a support forming a part of a magnetic circuit, a plurality of fixtures each secured to said ring so that one end of each fixture protrudes beyond said ring, a spacer disposed about the protruding end of each fixture, a body to be suspended having a pair of spaced flanges formed thereon, said flanges being of smaller diameter than and coaxial with said ring, a pair of thin flat leaf springs each having an annular central portion engaging and secured to one of said flanges, each spring further including a plurality of curved arms, one for each fixture, the inner end of each arm being integral with the central portion of said spring, and the outer end of each arm having an opening therein which registers with one of the fixtures extending through said ring, one of said springs having the outer end of its arms fitted over said fixtures and engaging one of said spacers, a second set of spacers rigidly connecting each arm of the last-mentioned spring with the corresponding arm of the other spring, and a set of bolts securing the arms of the other spring rigidly to said second set of spacers.

4. A spring suspension unit including a ring of non-magnetic material adapted to be secured to a support forming a part of a magnetic circuit, a plurality of fixtures each secured to said ring so that one end of each fixture protrudes beyond said ring, a spacer disposed about the protruding end of each fixture, a body to be suspended of smaller diameter than said ring and disposed coaxially therewith, a flat resilient plate means extending between said body and each of said fixtures, said resilient means terminating at the region of each fixture in an opening through which extends the corresponding fixture, and a ring of insulating material mounted by said fixtures above said resilient means.

5. A seismometer comprising, in combination, an elongated core, a cylindrical portion mounted coaxially with said core, a top plate and a bottom plate extending radially from the core to the cylindrical portion, all of said parts being formed from magnetic material so as to define a closed magnetic circuit, one of said plates being constructed and arranged to define, with said core, an annular air gap, an inertia body including a cylindrical metal coil-supporting portion, a coil mounted on said portion and disposed within said air gap, said inertia body having a part thereof protruding outwardly from said air gap and disposed outside the structure defining said closed magnetic circuit, a support mounted on the plate adjacent said protruding part, and a pair of longitudinally spaced leaf springs disposed between said protruding part and said support, each spring including a central circular portion secured to said inertia body and a plurality of curved arms each integral with the central portion at one end thereof and secured to said support at the other end thereof, the parts defining said closed magnetic circuit being held in assembled relation solely by magnetic attraction.

References Cited in the file of this patent

UNITED STATES PATENTS

| Number | Name | Date |
| --- | --- | --- |
| 2,130,213 | Wolf et al. | Sept. 13, 1938 |
| 2,417,077 | Hoover | Mar. 11, 1947 |
| 2,423,970 | Gardner | July 15, 1947 |
| 2,487,029 | Piety | Nov. 1, 1949 |

FOREIGN PATENTS

| Number | Country | Date |
| --- | --- | --- |
| 707,257 | Germany | June 27, 1941 |